United States Patent
Bell et al.

(10) Patent No.: US 10,348,737 B2
(45) Date of Patent: *Jul. 9, 2019

(54) LOGIN PERFORMANCE

(71) Applicant: International Business Machines Corporation, Armonk, NY (US)

(72) Inventors: Denise A. Bell, Austin, TX (US); Cristina Bonanni, Rome (IT); Patrizia Manganelli, Rome (IT); Randa Salem, Rome (IT)

(73) Assignee: International Business Machines Corporation, Armonk, NY (US)

( * ) Notice: Subject to any disclaimer, the term of this patent is extended or adjusted under 35 U.S.C. 154(b) by 41 days.

This patent is subject to a terminal disclaimer.

(21) Appl. No.: 15/063,773

(22) Filed: Mar. 8, 2016

(65) Prior Publication Data

US 2017/0264621 A1 Sep. 14, 2017

(51) Int. Cl.
*H04L 29/06* (2006.01)
*H04L 12/26* (2006.01)
*H04L 29/08* (2006.01)

(52) U.S. Cl.
CPC ............ *H04L 63/108* (2013.01); *H04L 43/16* (2013.01); *H04L 67/025* (2013.01); *H04L 67/10* (2013.01); *H04L 67/22* (2013.01); *H04L 67/325* (2013.01)

(58) Field of Classification Search
CPC ............................ H04L 63/108; H04L 63/083
See application file for complete search history.

(56) References Cited

U.S. PATENT DOCUMENTS

| | | | |
|---|---|---|---|
| 6,275,695 B1 * | 8/2001 | Obhan | H04L 41/0896 455/423 |
| 7,475,252 B2 | 1/2009 | Jeffries et al. | |
| 7,676,749 B2 | 3/2010 | Tobe | |
| 8,205,092 B2 | 6/2012 | Stokes | |
| 8,452,980 B1 | 5/2013 | Black et al. | |
| 2003/0105863 A1 * | 6/2003 | Hegli | H04L 63/10 709/225 |
| 2006/0136638 A1 * | 6/2006 | Banning | G06F 9/505 710/244 |

(Continued)

OTHER PUBLICATIONS

Bell et al., "Login Performance," U.S. Appl. No. 15/168,814, filed May 31, 2016.

(Continued)

*Primary Examiner* — Carl G Colin
*Assistant Examiner* — Vance M Little
(74) *Attorney, Agent, or Firm* — Erik K. Johnson

(57) ABSTRACT

An embodiment of the invention may include a method, computer program product and system for receiving a request from a user to access a system. The user requesting access has an associated job function. The embodiment of the invention may include determining an access window for the job function of the user. The access window for the job function is a range of time where historical usage of the system by one or more users having the job function is above a threshold amount. The embodiment of the invention may include determining whether a time of access of the request is within the access window. The embodiment of the invention may include granting access to the system based on determining that the time of access of the request is within the access window.

9 Claims, 6 Drawing Sheets

(56) References Cited

U.S. PATENT DOCUMENTS

| | | | |
|---|---|---|---|
| 2008/0162707 A1* | 7/2008 | Beck | G06F 21/6218 709/229 |
| 2008/0275983 A1* | 11/2008 | Ullmann | H04L 41/0213 709/224 |
| 2009/0282414 A1* | 11/2009 | Branda | G06F 9/5038 718/103 |
| 2011/0296003 A1 | 12/2011 | McCann et al. | |
| 2011/0321175 A1* | 12/2011 | Slater | G06F 21/552 726/28 |
| 2012/0020216 A1* | 1/2012 | Vashist | H04L 41/14 370/235 |
| 2012/0278881 A1 | 11/2012 | Mann et al. | |
| 2014/0153422 A1* | 6/2014 | Nambiar | H04L 47/122 370/252 |
| 2014/0189831 A1 | 7/2014 | Kemshall | |
| 2015/0012987 A1 | 1/2015 | Tian et al. | |
| 2015/0088708 A1 | 3/2015 | Fain et al. | |
| 2015/0121491 A1 | 4/2015 | Xia | |
| 2015/0128249 A1 | 5/2015 | Alexandrian et al. | |
| 2015/0149917 A1 | 5/2015 | Tanaka | |
| 2015/0172267 A1 | 6/2015 | Sato | |
| 2015/0242756 A1 | 8/2015 | Chittimalla et al. | |
| 2015/0312422 A1 | 10/2015 | Leemet et al. | |
| 2015/0332063 A1 | 11/2015 | Masuda | |

OTHER PUBLICATIONS

List of IBM Patents or Patent Applications Treated as Related, May 27, 2016, 2 pgs.

Mell et al., "The NIST Definition of Cloud Computing," Recommendations of the National Institute of Standards and Technology, U.S. Department of Commerce, Special Publication 800-145, Sep. 2011, 7 pgs.

Nan et al., "Reliability and Performance Testing Model of Web-based User Login and Access Control," Supported by the Natural Science Foundation of Henan Province (Individual service test based on SOA), Zheng Zhou University of Light Industry Ph.d Foundation (200903), 4 pgs., 978-1-4244-6977-2/10 © 2010 IEEE.

Siemens et al., "Search Engine based Prioritized Software Logging," an IP.com Prior Art Database Technical Discloaure, http://ip.com/IPCOM/000143689, 5 pgs., published Jan. 10, 2007, IP.com No. 000143689.

\* cited by examiner

US 10,348,737 B2

LOGIN PERFORMANCE

BACKGROUND

The present invention relates to improved user performance of server based applications, and more specifically, to limiting user access based on time of day and system load.

In computer security, logging in, (or logging on or signing in or signing on), is the process by which an individual gains access to a computer system, and access programs or files located on the computer system, by identifying and authenticating themselves. The user credentials are typically some form of "username" and a matching "password", and these credentials themselves are sometimes referred to as a login, (or a logon or a sign in or a sign on).

BRIEF SUMMARY

An embodiment of the invention may include a method, computer program product and system for receiving a request from a user to access a system. The user requesting access has an associated job function. The embodiment of the invention may include determining an access window for the job function of the user. The access window for the job function is a range of time where historical usage of the system by one or more users having the job function is above a threshold amount. The embodiment of the invention may include determining whether a time of access of the request is within the access window. The embodiment of the invention may include granting access to the system based on determining that the time of access of the request is within the access window.

DETAILED DESCRIPTION

Figure 1:
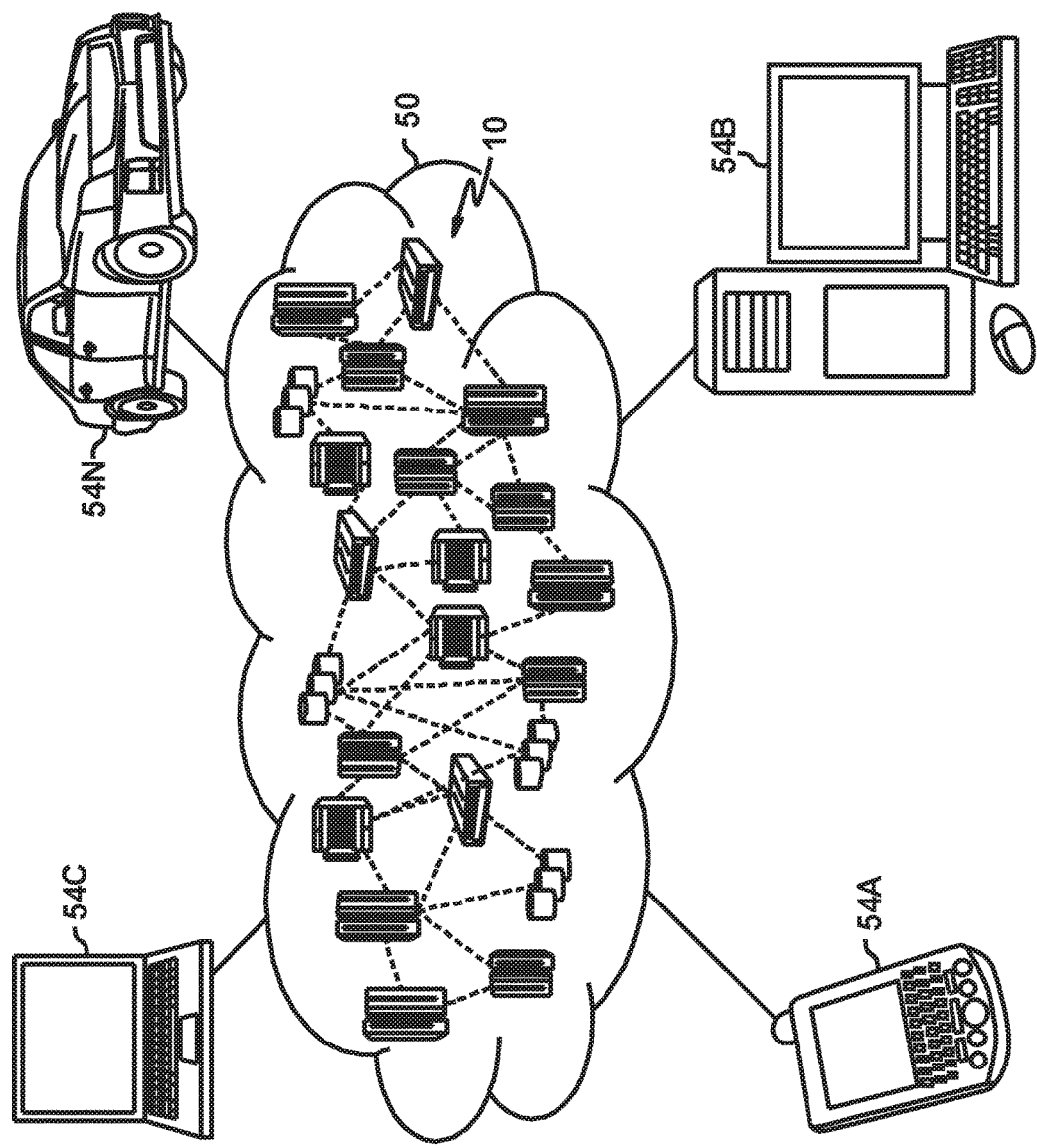
FIG. 1 depicts a cloud computing environment according to an embodiment of the present invention.

Embodiments of the present invention will now be described in detail with reference to the accompanying Figures.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
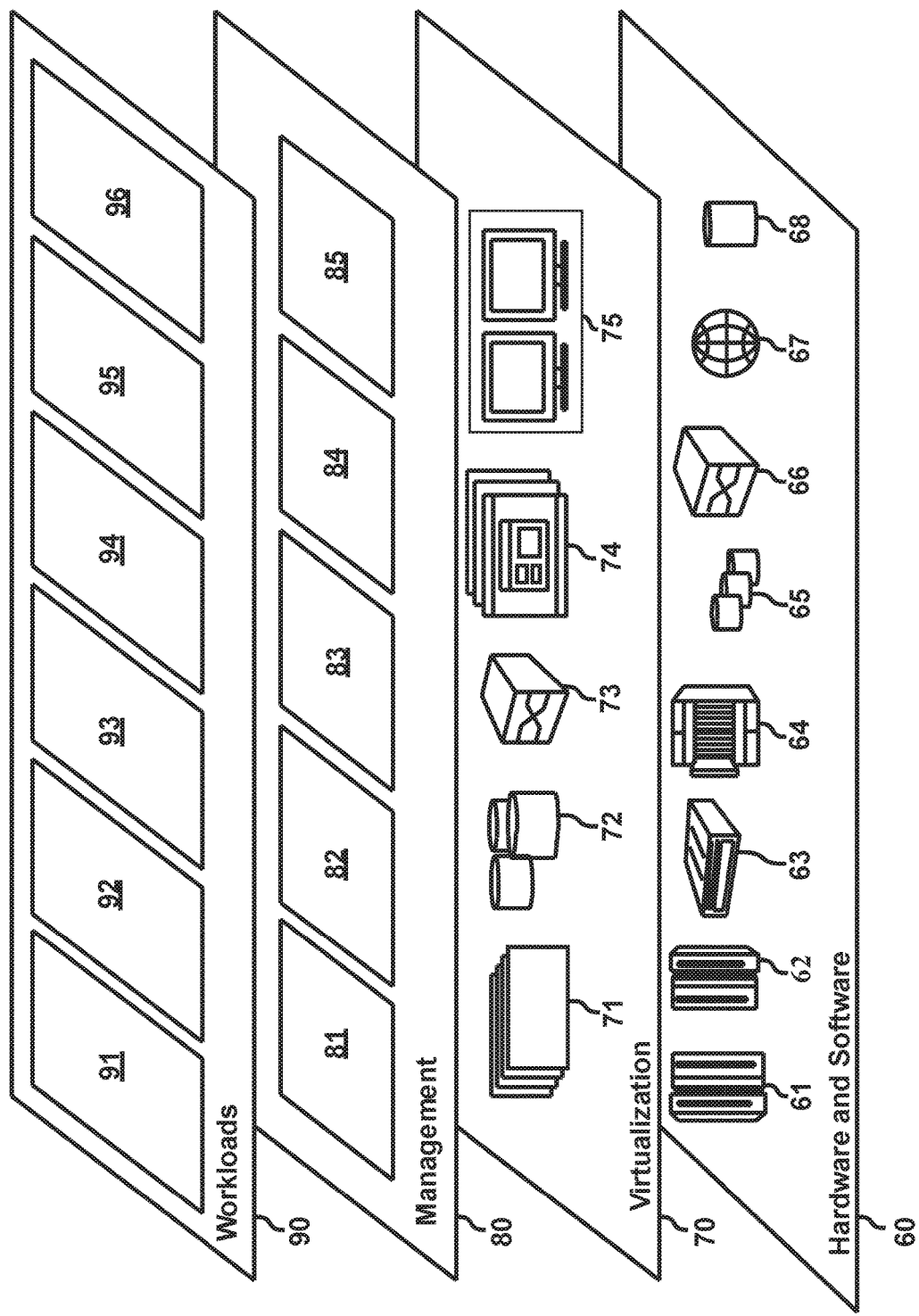
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and login program 96.

Figure 3:
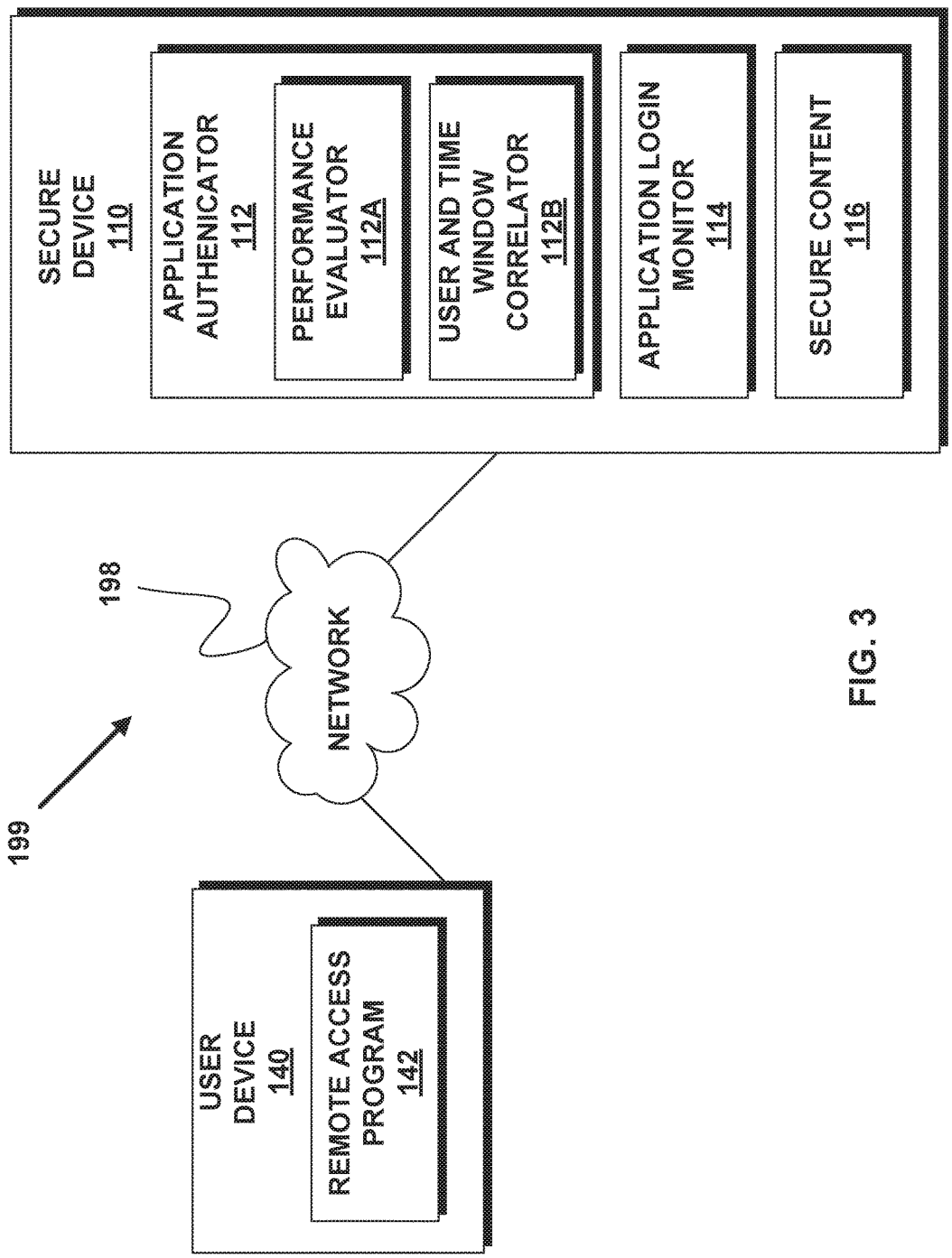
FIG. 3 illustrates a login system, in accordance with an embodiment of the invention.

FIG. 3 illustrates login system 199, in accordance with an embodiment of the invention. In an example embodiment, login system 199 includes a secure device 110 and a user device 140 interconnected via a network 198.

In the example embodiment, network 198 is the Internet, representing a worldwide collection of networks and gateways to support communications between devices connected to the Internet. Network 198 may include, for example, wired, wireless or fiber optic connections. In other embodiments, network 198 may be implemented as an intranet, a local area network (LAN), or a wide area network (WAN). In general, network 198 can be any combination of connections and protocols that will support communications between the secure device 110 and the user device 140.

User device 140 may include a remote access program 142. User device 140 may be a desktop computer, a notebook, a laptop computer, a tablet computer, a handheld device, a smart-phone, a thin client, or any other electronic device or computing system capable of receiving and sending data to and from other computing devices such as secure device 110 via network 198, in order to logon to a secure system. User device 140 is described in more detail with reference to FIG. 3.

Remote access program 142 may be a program, or subroutine contained in a program, that receives input from a user and communicates with the application authenticator 112, located on secure device 110, in order to gain access to secure content 116 located on the secure device. Remote access program 142 includes components used to receive input from a user and transmit the input to an application residing on secure device 110. In one example, the remote access application authenticator 112 receives input from a user, such as username and password, which is validated and authenticated by the application authenticator 112 to identify the user. Once the password has been validated, remote access program 142 grants the user access to the information, services or applications located on secure device 110, such as secure content 116.

Secure device 110 includes application authenticator 112, application login monitor 114 and secure content 116. In the example embodiment, secure device 110 is a server, desktop computer, a notebook, a laptop computer or any other electronic device or computing system capable of receiving and sending data to and from user device 140 via network 198, and capable of distributing the services and/or files located on secure device 110. Although not shown, optionally, secure device 110 can comprise a cluster of servers executing the same software to collectively process the requests of multiple user and distribute the requisite services and/or files located on secure device 110. Secure device 110 is described in more detail with reference to FIG. 3.

Application login monitor 114 is a database located on secure device 110 containing details about each user authorized to access the secure device 110. In an example embodiment, application login monitor 114 contains information for each user such as, for example, role, title, location, login characteristics (frequency, time, duration), material accessed during login, or any other information pertinent to a user's possible demand to the system. Additionally, application login monitor may contain more general operational characteristics, such as historical performance demand, performance requirements for specific tasks, etc. Application login monitor 114 is described in further detail below with regard to FIGS. 4a and 4b.

Secure content 116 is a file located on secure device 110 containing information that has restricted access, either through password protection or some other system of authentication. Secure content 116 may be a database, web content, program modules, or any type of information run on secure device 110 that a user could access.

Application authenticator 112 is a software application or configuration in a software application capable of receiving user credentials and from remote access program 142, and authenticating a user to allow access to secure content 116. Application authenticator additionally determines whether a user should be allowed to access the secure content 116 based on the user's role and whether the additional load the user may cause to the system would impact overall performance. In addition, application authenticator 112 contains performance evaluator 112A and usage correlator 112B in order to determine, and predict, load and impact. Performance evaluator 112A determines the current performance of the system, as well as determining historical performance due to retrieving and displaying relevant information located in secure content 116 to the user. Performance evaluator 112A may additionally contain a historical usage model of system performance, which may correlate historical performance trends to factors such as day of the week, time, holidays, season, etc., and may be used to return a predicted system usage for future time periods. Performance evaluator 112A may monitor and record the performance of network adaptor 912, processor(s) 904, RAM 916, cache 918 or physical aspects of secure device 110. Usage correlator 112B may be a model of usage for the user or for a global category of user, based on information contained in application login monitor 114, which attempts to predict a user's usage during any session based on historical data, such as activities performed by the user during previous sessions, and what times and dates those activities occurred. Additionally, usage correlator 112B may use historical usage contained in application login monitor 114 in order to create access windows, whereby behavior for a specific group of users is modeled based on the time and date, and the group usage behaviors may be used to determine that the group should have priority at specific days and times. The operations and functions of application authenticator 112 are described in further detail below with regard to FIGS. 4a and 4b.

Figure 4A:
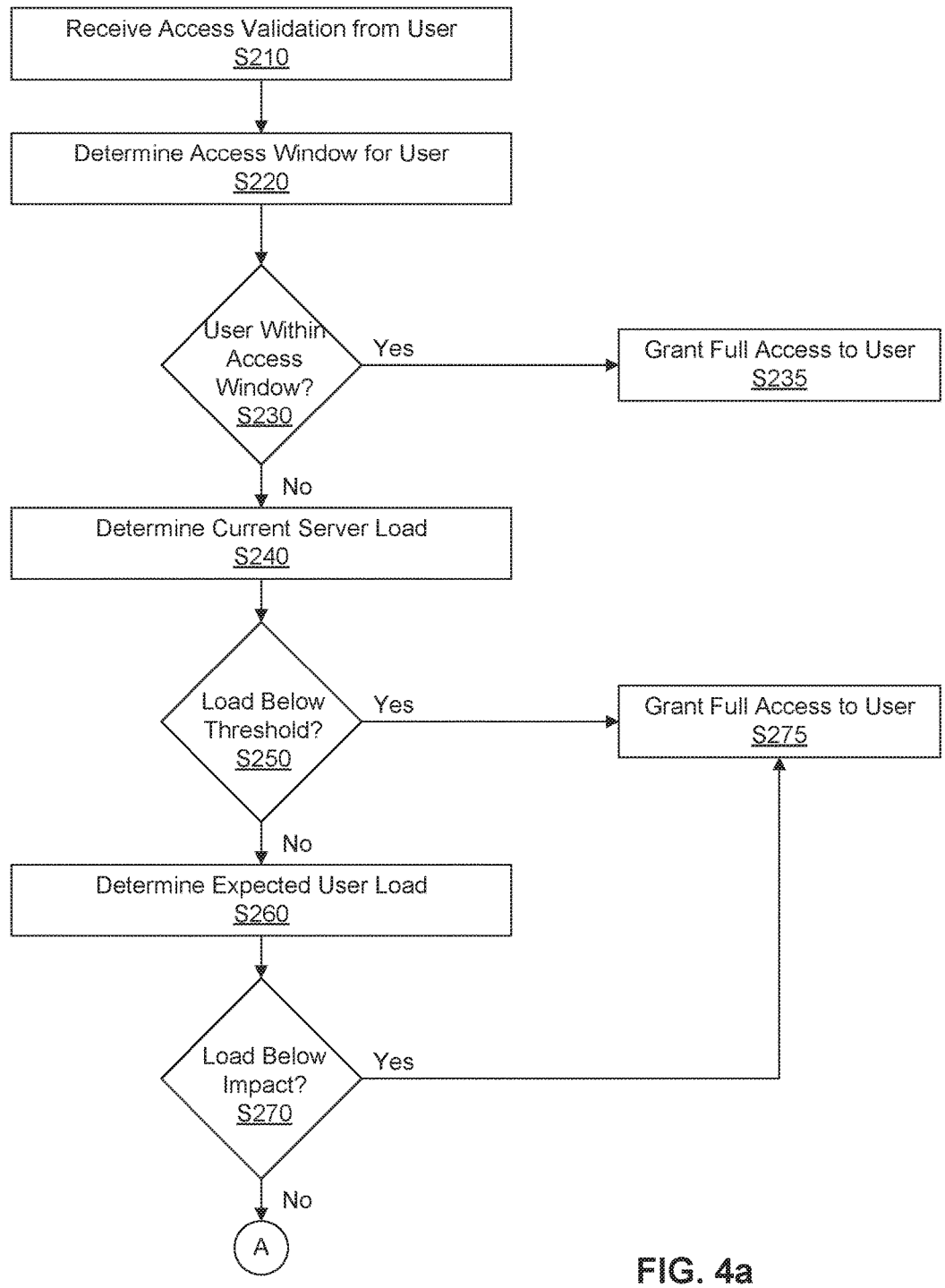
FIGS. 4a and 4b are a flowchart illustrating the operations of the application authenticator of FIG. 3, in accordance with an embodiment of the invention.
Figure 4B:
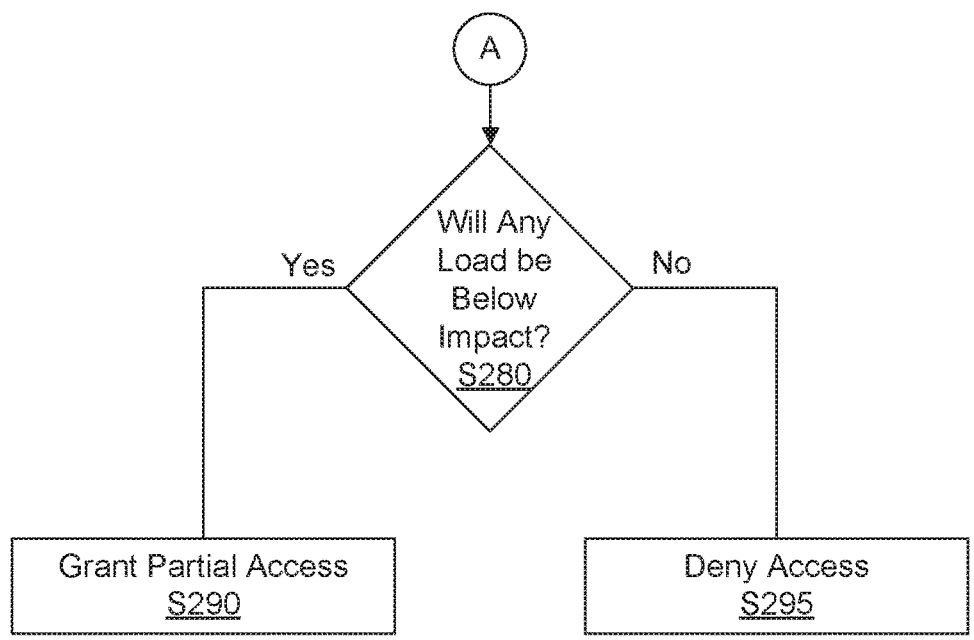

FIGS. 4a and 4b show a flow chart illustrating the operations of application authenticator 112 in accordance with an embodiment of the invention. Referring to step S210, application authenticator 112 receives an authentication that a user of user device 140 is authorized to access secure content 116. The authentication may entail a user entering a user ID and password, or receiving information from remote access program 142 that identifies and authorizes the user. As part of the authentication, application authenticator 112 receives unique information detailing the specific user, which may allow application authenticator 112 to retain, or recall, information about that user's previous sessions.

In one example embodiment, application authenticator 112 receives a request to authenticate a user attempting to access secure content 116. The request to authenticate a user may include a login request, where a user is prompted to enter a unique ID and password into a system, and the application authenticator 112 confirms that the entered password matches the password stored in a password database, where the stored password is associated with the unique ID.

Referring to step S220, application authenticator 112 determines the access window for the authenticated user. The access window is a point in time where a user having a specified criterion (e.g. roll, title, location), will always be allowed to access the secure content 116 following authentication. In one embodiment, the access window may be a time defined by a system administrator (e.g. 9 AM-5 PM) where a user should always be granted access due to their responsibilities. In another embodiment, the access window may be determined using historical data, contained in application login monitor 114, for all users in a specific role and/or time-zone to determine which periods of time those users are most active, and infer that this activity should give such users priority over others. For example, the access window may be determined by instances where users of a certain group are above a threshold percentage of the overall system usage, or periods of time where users of a group are logged into the secure content 116 for prolonged periods of time. Additionally, the access window may be determined by the usage of the system by one or more users with the same, or similar, job functions being above a threshold amount. In some embodiments, the access window may be adjusted based seasonal trends, day of the week, the occurrence of a holiday, or other factors that may affect usage.

Referring to step S230, application authenticator 112 determines if the user is attempting to login at a time within the user's access window. If the user is within the access window, application authenticator 112 proceeds to step S235. If the user is not within the access window, application authenticator proceeds to step S240.

Referring to step S235, the user is granted full access to the secure content 116. The user is allowed to access or use any content contained in secure content 116 for as long as the user is logged into the system. The user may be logged into the system for a login duration (i.e. a set amount of time), whereby access to the secure content 116 is restricted after the user has been logged into the system longer than the login duration. Following the restriction of access, the user may be prompted to login again (i.e. start at step S210) to regain access to the secure content 116. In one embodiment, in step S235 the user may be granted access for a relatively long login duration (e.g. 1 hour), as the user is within their access window, and the users load on the system does not factor into determining whether the user should be granted access to the secure content 116.

Referring to step S240, application authenticator 112 determines the current load on the server. The load may be based on the amount of processing power used, the amount of memory allocated, the bandwidth across the network adaptor, or any other computer variable that may impact a user experience.

Additionally, application authenticator 112 may determine a threshold load for the system. The threshold load may be a single variable, or a combination of multiple variables, that, alone or combined, would impact the performance to a primary user of the system. The threshold load may be set using an acceptable lag for primary users. For example, an acceptable load may be a 10 second response time for the user. In one example, the threshold load may be calculated using the greater of either the current load of the system, or the historical load of the system during similar conditions (e.g. time of day, day of week, month of year). In an additional embodiment, the threshold load may be reduced by a buffer value, to ensure proper system performance for primary users. In one example, the buffer value may be the load added to the system if 50% of primary users were to access the system.

Referring to step S250, application authenticator 112 determines if overall load on the system is below the threshold load. If overall load on the system is below the threshold load, application authenticator 112 proceeds to step S275. If overall load on the system is above the threshold load, application authenticator proceeds to step S260.

Referring to step S260, application authenticator 112 determines the user's expected load to the secure content 116. The user's expected load can be determined using a model created from data contained in application login monitor 114. The model may correlate a user's usage with factors, such as, day of the week, time, location and access device to determine what actions the user may make when accessing the secure content 116. These actions may be cross-referenced to assigned values for specific actions located in application login monitor 114, or determined using performance evaluator 112A, to determine a predicted load that the user may add to the system.

Referring to step S270, application authenticator 112 determines if overall load on the system when the user is added is below an impact load. The impact load may be may be a single variable, or a combination of multiple variables, that, alone or combined, would impact the performance to a primary user of the system. If overall load on the system is below an impact load, application authenticator 112 proceeds to step S275. If overall load on the system is above the impact load, application authenticator proceeds to step S280.

Referring to step S275, the user is granted full access to the secure content 116. The user is allowed to access or use any content contained in secure content 116 for as long as the user is logged into the system. The user may be logged into the system for a login duration (i.e. a set amount of time), whereby access to the secure content 116 is restricted after the user has been logged into the system longer than the login duration. Following the restriction of access, the user may be prompted to login again (i.e. start at step S210) to regain access to the secure content 116. In one embodiment, in step S235 the user may be granted access for moderate login duration (e.g. 30 minutes), as the user is within their access window, and the users load on the system does not factor into determining whether the user should be granted access to the secure content 116.

Referring to step S280, application authenticator 112 determines if any additional load on the system when the user is added would be below the impact load. Additional load may be determined by finding the difference between current load and impact load, and search application login monitor 114 for any tasks that would be less than the differences in load. If any additional tasks could be performed such that the load on the system is below an impact load, application authenticator 112 proceeds to step S290. If there are no additional tasks could be performed such that the load on the system would be below the impact load, application authenticator proceeds to step S295.

Referring to step S290, the user is granted partial access to the secure content 116. Granting partial access to the user restricts certain types of actions or content while accessing the secure content 116. The restricted actions are those the user could undertake that put overall system load above the impact. The user may be logged into the system for a login duration (i.e. a set amount of time), whereby access to the secure content 116 is restricted after the user has been logged into the system longer than the login duration. Following the restriction of access, the user may be prompted to login again (i.e. start at step S210) to regain access to the secure content 116. In one embodiment, in step S235 the user may be granted access for short login duration (e.g. 10 minutes), as the user is within their access window, and the users load on the system does not factor into determining whether the user should be granted access to the secure content 116.

Referring to step S295, the user is denied access to the secure content 116. In some embodiments, the user may be notified of the time window determined in step S220, in which they are guaranteed access. In additional embodiments, the user may be notified of the denial of access due to overall system load.

Figure 5:
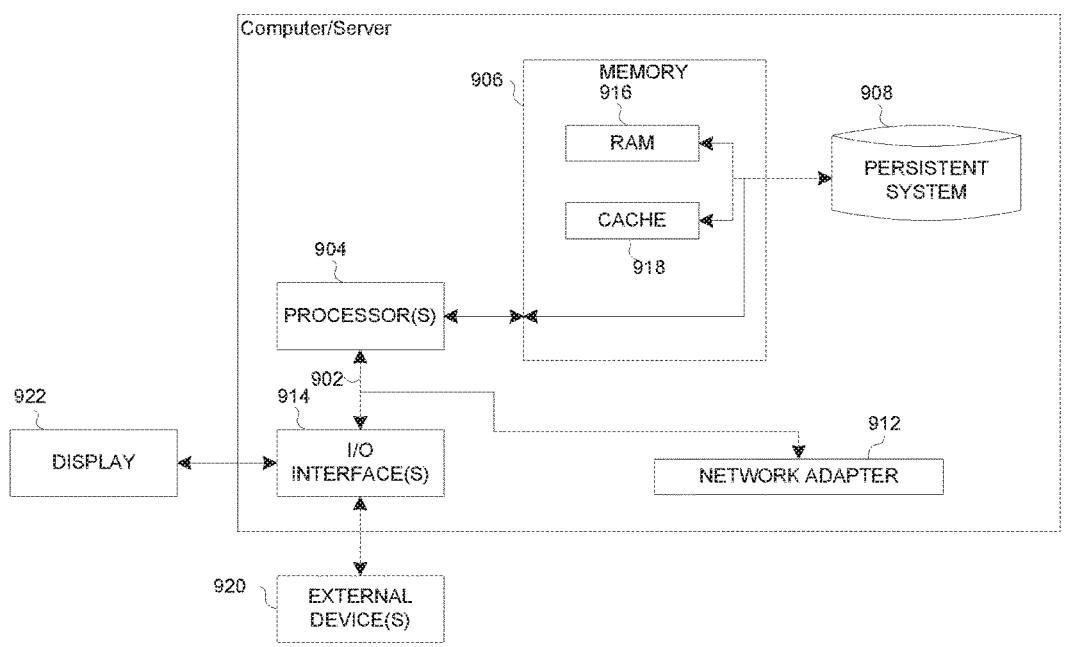
FIG. 5 is a block diagram depicting the hardware components of the login system of FIG. 3, in accordance with an embodiment of the invention.

FIG. 5 depicts a block diagram of components of secure device 110 and user device 140, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Secure device 110 and user device 140 include communications fabric 902, which provides communications between computer processor(s) 904, memory 906, persistent storage 908, communications unit 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs application authenticator 112, application login monitor 114, and secure content 116 in secure device 110; and remote access program 142 in user device 140 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 912, in these examples, provides for communications with other data processing systems or devices. In these examples, communications unit 912 includes one or more network interface cards. Communications unit 912 may provide communications through the use of either or both physical and wireless communications links. The programs application authenticator, application login monitor 114, user interface 116, and user display 128 in secure device 110; and remote access program 142 in user device 140 may be downloaded to persistent storage 908 through communications unit 912.

I/O interface(s) 914 allows for input and output of data with other devices that may be connected to secure device 110 and user device 140. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., The programs application authenticator 112, application login monitor 114, and secure content 116 in secure device 110; and remote access program 142 in user device 140, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A computer program product for granting user access, the computer program product comprising:
one or more computer-readable storage devices and program instructions stored on at least one of the one or more computer-readable storage devices, the program instructions comprising:
program instructions to receive a request from a user to access a system, wherein the user has an associated job function;
program instructions to determine an access window for the associated job function of the user, wherein the access window is determined based on historical usage for users in the associated job function accounting for a system usage above a threshold percentage of overall system usage, and wherein the overall system usage comprises one or more metrics selected from the group consisting of: processor performance of the system, memory allocated of the system, and a bandwidth across a network adaptor of the system;
program instructions to determine whether a time of access of the request is within the access window;
based on determining that the time of access of the request is not within the access window, program instructions to determine whether a load on the system is below a threshold value; and
based on determining that the load on the system is below a threshold value, program instructions to grant access to the system.

2. The computer program product of claim 1, further comprising:
based on determining that the time of access of the request is not within the access window, program instructions to determine whether a predicted load on the system corresponding to the time of access is below a threshold value, wherein the predicted load of the system corresponding to the time of access is an estimated load on the system determined based on a historical performance of the system during corresponding historical times of access; and
based on determining that the predicted load on the system is below a threshold value, program instructions to grant access to the system.

3. The computer program product of claim 1, further comprising:
based on determining that the time of access of the request is not within the access window, program instructions to determine a predicted user load on the system for the user, wherein the predicted user load on the system is based on historical actions performed by the user and a load on the system caused by each historical action performed by the user;
program instructions to determine whether the predicted user load on the system and a current load on the system is below a threshold value; and
based on determining that the predicted user load on the system and a current load on the system is below a threshold value, program instructions to grant access to the system.

4. The computer program product of claim 3, further comprising:
based on determining that the predicted load on the system and the current load on the system is above a threshold value, program instructions to determine whether there are one or more actions that maintain system usage below the threshold value; and
based on determining that there are one or more actions, program instructions to grant access to the one or more actions of the system, wherein granting access to the system consists of enabling the one or more actions for the system.

5. The computer program product of claim 2, wherein the program instructions to determine the predicted load on the system comprise:
   program instructions to create a load model correlating a historical system load to a historical time of access; and
   program instructions to determine the predicted load based on cross-referencing the time of access to the load model.

6. A computer system for granting user access, the computer system comprising:
   one or more processors, one or more computer-readable memories, one or more computer-readable storage devices, and program instructions stored on at least one of the one or more computer-readable storage devices for execution by at least one of the one or more processors via at least one of the one or more computer-readable memories, the program instructions comprising:
      program instructions to receive a request from a user to access a system, wherein the user has an associated job function;
      program instructions to determine an access window for the associated job function of the user, wherein the access window is determined based on historical usage for users in the associated job function accounting for a system usage above a threshold percentage of overall system usage, and wherein the overall system usage comprises one or more metrics selected from the group consisting of: processor performance of the system, memory allocated of the system, and a bandwidth across a network adaptor of the system;
      program instructions to determine whether a time of access of the request is within the access window;
      based on determining that the time of access of the request is not within the access window, program instructions to determine whether a load on the system is below a threshold value; and
      based on determining that the load on the system is below a threshold value, program instructions to grant access to the system.

7. The computer system of claim 6, further comprising:
   based on determining that the time of access of the request is not within the access window, program instructions to determine whether a predicted load on the system corresponding to the time of access is below a threshold value, wherein the predicted load of the system corresponding to the time of access is an estimated load on the system determined based on a historical performance of the system during corresponding historical times of access; and
   based on determining that the predicted load on the system is below a threshold value, program instructions to grant access to the system.

8. The computer system of claim 6, further comprising:
   based on determining that the time of access of the request is not within the access window, program instructions to determine a predicted user load on the system for the user, wherein the predicted user load on the system is based on historical actions performed by the user and a load on the system caused by each historical action performed by the user;
   program instructions to determine whether the predicted user load on the system and a current load on the system is below a threshold value; and
   based on determining that the predicted user load on the system and a current load on the system is below a threshold value, program instructions to grant access to the system.

9. The computer system of claim 8, further comprising:
   based on determining that the predicted load on the system and the current load on the system is above a threshold value, program instructions to determine whether there are one or more actions that maintain system usage below the threshold value; and
   based on determining that there are one or more possible actions, program instructions to grant access to the one or more actions of the system, wherein granting access to the system consists of enabling the one or more actions for the system.

* * * * *